United States Patent [19]

Pappalardo et al.

[11] Patent Number: 4,952,422
[45] Date of Patent: Aug. 28, 1990

[54] A METHOD OF COATING A LAYER OF AN YTTRIUM VANADATE PHOSPHOR CONTAINED IN A FLUORESCENT LAMP WITH $Y_2O_3$ OR $Al_2O_3$ AND LAMPS MADE THEREFROM

[75] Inventors: Romano G. Pappalardo, Sudbury; Thomas E. Peters, Chelmsford; Roger B. Hunt, Jr., Medfield, all of Mass.

[73] Assignee: GTE Laboratories Incorporated, Waltham, Mass.

[21] Appl. No.: 161,643

[22] Filed: Feb. 29, 1988

Related U.S. Application Data

[62] Division of Ser. No. 854,241, Apr. 21, 1986, abandoned.

[51] Int. Cl.[5] .......................... B05D 5/06; B05D 5/12
[52] U.S. Cl. .......................... 427/67; 427/69; 427/70; 427/107; 427/237; 427/255; 427/343; 427/377; 427/419.2
[58] Field of Search .............. 427/35, 67, 69, 70, 106, 427/107, 230, 237, 250, 255, 343, 377, 383.3, 383.5, 419.2; 313/486, 487, 489

[56] References Cited

U.S. PATENT DOCUMENTS

| | | | |
|---|---|---|---|
| 2,692,347 | 10/1954 | Mason | 427/67 |
| 3,555,337 | 1/1971 | Faria et al. | 427/67 |
| 3,858,082 | 12/1974 | Thornton | 313/487 |
| 4,079,287 | 3/1978 | Soules | 313/487 |
| 4,459,507 | 7/1984 | Flaherty | 313/489 |
| 4,547,700 | 10/1985 | Landry | 313/489 |
| 4,607,191 | 8/1986 | Flaherty | 313/489 |
| 4,633,133 | 12/1986 | Flaherty | 313/489 |
| 4,639,637 | 1/1987 | Taubner et al. | 313/489 |
| 4,698,239 | 10/1987 | Flaherty | 427/67 |
| 4,710,674 | 12/1987 | Sigai | 427/67 |

FOREIGN PATENT DOCUMENTS 58-5946  1/1983  Japan ..................................... 427/67

*Primary Examiner*—Stanley Silverman
*Attorney, Agent, or Firm*—Ivan L. Ericson

[57] ABSTRACT

A fluorescent lamp containing a $Y_2O_3$ or $Al_2O_3$ coating on a layer of yttrium vanadate phosphor and a method of coating the layer of the yttrium vanadate phosphor with a continuous protective coating of $Y_2O_3$ or $Al_2O_3$ is described. The method comprises applying a coating of a metal, such as yttrium or aluminum, on the yttrium vanadate phosphor then lehring the metallic coating at about 500° C. to about 625° C. to form a continuous protective coating of $Y_2O_3$ or $Al_2O_3$ overlaying the layer of phosphor.

3 Claims, 1 Drawing Sheet

A METHOD OF COATING A LAYER OF AN YTTRIUM VANADATE PHOSPHOR CONTAINED IN A FLUORESCENT LAMP WITH $Y_2O_3$ OR $AL_2O_3$ AND LAMPS MADE THEREFROM

This is a divisional of co-pending patent application Ser. No. 854,241 filed on 4/21/86, now abandoned.

FIELD OF THE INVENTION

This invention relates to coated lamp phosphors and lamps made therefrom.

More particularly, this invention relates to coated yttrium vanadate lamp phosphors and lamps made therefrom.

BACKGROUND OF THE INVENTION

In fluorescent lamps the conversion of UV radiation (from a low-pressure Hg-plasma) into visible light is performed by phosphor powders. Very frequently the efficiency of such a conversion decreases with time, as the phosphor is exposed to the Hg plasma during the lamp operation. This causes a decrease in the lamp output, that is defined as maintenance loss.

The loss in phosphor efficiency is most likely produced by the synergistic action of various mechanisms, such as: (1) phosphor damage caused by UV-irradiation, by impact of energetic plasma components, and by chemical attack from Hg; (2) the adsorption of UV-absorbing Hg films onto the phosphor.

In view of the potential multiplicity of efficiency-lowering mechanisms, and of the variety of the chemical composition and activator content in commercial lighting phosphors, it is generally very difficult to predict, in dealing with a specific class of phosphors, the dominant process causing the maintenance loss during lamp operation.

Yttrium vanadate phosphors activated either with trivalent rare-earth ions, or with post-transition ($ns^2$) ions, such as $In^{3+}$ and $Bi^{3+}$, are efficient converters of UV radiation into visible light. The $(VO_4)^{3-}$ complex ion absorbs efficiently over most of the UV spectral region of interest in fluorescent lighting, the excitation energy then relaxing to a long-lived, triplet level of the vanadate group, whence it can sensitize the emission from either trivalent rare-earth ions or $ns^2$ ions.

In fluorescent lighting applications, though, the vanadate phosphors rapidly degrade when exposed to a Hg plasma. Therefore, they have been commercially used to-date only as color-correcting phosphors in HID (High-Intensity Device) sources, namely in double-envelope lamps, wherein the phosphor is not in direct contact with a Hg plasma, but is simply excited by UV radiation. Therefore, it is advantageous to lessen the lamp degradation of vanadate phosphors so that these phosphors can be utilized within a lamp in which the phosphor is exposed to a Hg plasma.

OBJECTS OF THE INVENTION

It is an object of the present invention to provide an improved fluorescent lamp.

It is another object of this invention to provide an improved fluorescent lamp with a yttrium vanadate phosphor therein having a protective coating of yttria or alumina thereon.

It is a further object of this invention to provide an improved yttrium vanadate fluorescent lamp phosphor having an improved lamp maintainence.

It is a further object of this invention to provide a new and improved process for coating an yttrium vanadate phosphor or a phosphor blend containing an yttrium vanadate phosphor with a protective oxide coating.

SUMMARY OF THE INVENTION

These and still further objects, features and advantages of the invention are achieved, in accordance therewith, by providing a light transparent envelope containing an ionizable medium which includes mercury vapor, electrodes sealed into the ends of the envelope, and a layer of yttrium vanadate phosphor or a phosphor blend containing a vanadate phosphor on the interior surface of the envelope. In accordance with one aspect of the invention, the layer of phosphor on the interior surface is coated with a continuous protective coating of yttria or alumina.

In accordance with another aspect of the invention a new and improved process for applying a continuous protective coating of an oxide overlying a layer of yttrium vanadate phosphor comprises the following steps:

Step 1—A physical vapor deposition PVD coating of a metal of the oxide is applied on the phosphor to form a metallic coating.

Step 2—The metallic coating is lehred at about 500° C. to about 625° C. form a continuous protective coating of the oxide overlying the layer of yttrium vanadate phosphor.

In accordance with a further aspect of the invention a new and improved process for applying continuous protective coating of an oxide overlying a layer of yttrium vanadate phosphor comprises the following steps:

Step 1—An oxide source is heated with an e-beam to form an oxide vapor.

Step 2—The oxide vapor is deposited on the layer of yttrium vanadate phosphor to form a continuous protective coating of the oxide overlying the layer of yttrium vanadate phosphor.

In accordance with still another aspect of the invention a new and improved process for applying continuous protective coating of alumina overlying a layer of yttrium vanadate phosphor comprises the following steps:

Step 1—Aluminum isopropoxide is evaporated in a vacuum, over the phosphor to form a continuous coating of aluminum alkoxide overlying the layer of yttrium vanadate phosphor.

Step 2—The continuous coating is converted from aluminum alkoxide to a continuous coating of alumina.

Figure 1:
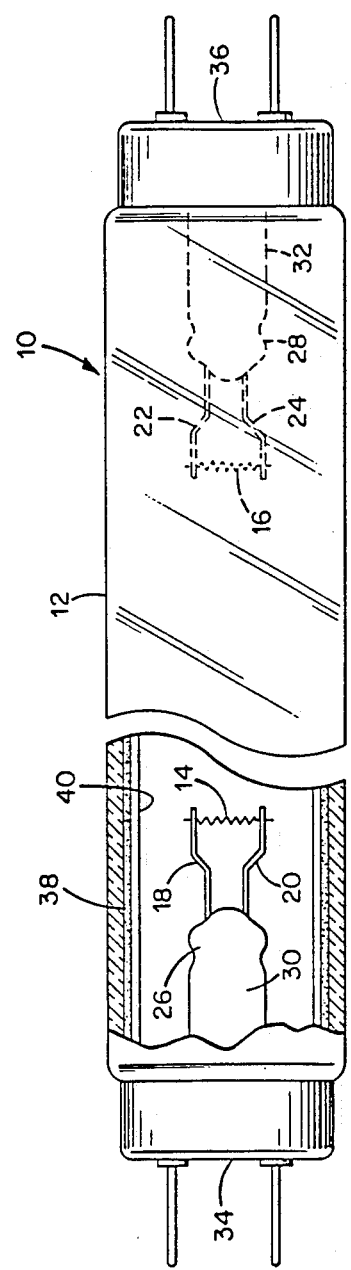
FIG. 1 is a view of a fluorescent lamp, particularly in section, diagrammatically illustrating an embodiment of the invention in accordance with the present invention.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

Referring now to the drawings with greater particularity, there is shown in FIG. 1 a fluorescent lamp 10. Lamp 10 comprises an elongated sealed glass envelope 12 of circular cross section. It has the usual electrodes 14 and 16 at each end supported by lead-in wires 18, 20 and 22, 24, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of envelope 12 is coated with a layer of yttrium vanadate phosphor 38 or a blend containing a yttrium vanadate phosphor.

A phosphor coating suspension is prepared by dispersing the phosphor particles in a water base system employing polyethylene oxide as the binder with water as the solvent.

The phosphor suspension is applied in the usual manner of causing the suspension to flow down the inner surface of envelope 12 and allowing the water to evaporate, leaving the binder and phosphor particles adhered to the envelope 12 wall. The phosphor coated envelope 12 is then heated in a lehr oven to volatilize the organic components, the phosphor layer 38 remaining on the envelope 12 wall.

According to method 1), the yttrium vanadate phosphor layer 38 is then coated by physical vapor deposition (PVD) with a layer of metallic yttrium; this is followed by a lehring operation to convert the metallic yttrium layer to a yttria layer, thus forming a continuous protective yttria coating 40 overlying the yttrium vanadate phosphor layer 38. In accordance with the present invention yttrium vanadate phosphors overlaid with a continuous protective coating of yttria exhibit greatly reduced lumen loss during operation in fluorescent lamps and exhibit higher output than lamps containing the uncoated phosphors. This maintenance improvement has been observed in $Eu^{3+}$ and $Dy^{3+}$ activated yttrium vanadate phosphors coated with yttria ($Y_2O_3$). The maintenance improvement can also be obtained with yttrium vanadate activated with trivalent rare-earth ions such as $Pr^{3+}$, $Nd^{3+}$, $Sm^{3+}$, $Gd^{3+}$, $Tb^{3+}$, $Ho^{3+}$, $Er^{3+}$, $Tm^{3+}$, and $Yb^{3+}$ as well as activated with trivalent bismuth and trivalent indium.

EXAMPLE 1

Layers of $YVO_4$:Dy phosphor were prepared by settling on pyrex slides (of dimensions 1"×0.75"×1 mm) a slurry of the phosphor powder in a water-base vehicle. The phosphor slides were dried in air at room temperature, and then underwent a firing treatment in air at 625° C. (lehring), to simulate the baking step in lamp fabrication. Some of the settled, lehred slides were subsequently PVD coated in vacuum with an evaporated layer of Yttrium metal, approx. 400 Angstrom thick. The coated slides then underwent a second lehring treatment at about 500° C. to about 625° C., to convert the Yttrium metal to the corresponding oxide. Some of the uncoated slides, to be used as controls, also underwent the second lehring treatment.

Both coated and uncoated slides were then positioned contiguously in demountable fluorescent lamps, of approximate T-12 bore, operating at a current of approx. 400 mA RMS, and at a Argon pressure of 2-3 Torr. The brightness output from the phosphor layer facing the mercury plasma was monitored by means of a Tektronix Lumen Probe Model J-16. The demountable fluorescent lamps also contained uncoated slides, similarly prepared, of phosphors, such as $Y_2O_3$:Eu and $(Ce,Tb)MgAl_{11}O_{19}$, i.e., CAT, known to exhibit very low maintenance losses in this type of lamp.

The phosphor-output measurements during lamp operation gave the following results. In the case of one lamp (lamp #3 of the test station), the brightness of the phosphor slides was measured after 45 minutes of lamp operation, and normalized to that of the CAT phosphor contained in the same lamp. The uncoated slide (A22) of $YVO_4$:Dy exhibited at 45 minutes a relative brightness of 60.9%, while the Yttria-coated slide (A40) showed a lower brightness of 55.8, approximately 9% lower than that of the uncoated slide.

After 500 hours of lamp operation, the situation was reversed, in the sense that the uncoated phosphor was less bright than the coated one, with brightness (relative to CAT) of 47.5% vs 53.6%, respectively. This trend, whereby the brightness of the coated phosphor exceeded that of the uncoated material, continued throughout the lamp operating lifetime, until at approx. 1,900 hrs. the maintenance loss, defined as relative brightness at 45 minutes less the relative brightness at approx. 1,900 hrs., divided by the original value of the relative brightness, had the following values:

| MAINTENANCE LOSS OF $YVO_4$: Dy AT 1900 HOURS (LAMP #3) | | |
|---|---|---|
| A22 | uncoated phosphor | 26% |
| A40 | Yttria-coated phosphor | 2.5% |

Similar observations were recorded for phosphors run in lamp #2 of the test station.

| MAINTENANCE LOSS OF $YVO_4$: Dy AT 930 HOURS (LAMP #2) | | |
|---|---|---|
| A24 | uncoated phosphor | 19% |
| A25 | uncoated phosphor | 21.3% |
| A37 | uncoated phosphor | 24.5% |
| A36 | uncoated phosphor | 22% |
| A35 | Yttria-coated phosphor | 3% |
| A38 | Yttria-coated phosphor | 2.4% |

These results demonstrate a very substantial improvement, up to a 10 fold improvement, in lamp maintenance of yttrium vanadate phosphors coated with a thin $Y_2O_3$ layer.

EXAMPLE 2

$YVO_4$:Eu

Europium-activated Yttrium Vanadate (Sylvania Type 2390) in powder form was slurried in water based vehicle and settled onto slides, as per Example 1. The dried phosphor slides were lehred in air at 625° C. After lehring, some of the phosphor slides were mounted in the sample stage of an electron-beam evaporator and coated with a 200 Angstrom thick layer of $Al_2O_3$, obtained from the e-beam evaporation of an alumina target.

$Al_2O_3$ coated phosphor slides (and similarly treated, but uncoated, slides used as controls) were mounted in the demountable test-lamps, as described for Example 1.

After 1250 hours of lamp operation, the lumen loss was reduced to 12% by the presence of the protective oxide coating as compared to a 30% loss for the uncoated phosphor slide. The protective action of the coating was less dramatic than for Example 1, either because of insufficient thickness of the $Al_2O_3$ layer, or because of its nonuniformity. In effect, during e-beam evaporation the sample stage was not rotated, as customary to ensure uniform deposition, because of detachment and loss of powder from the down-facing phosphor slides.

EXAMPLE 3

$YVO_4$:Eu was coated with approx. 200 Angstrom of $Y_2O_3$ by the procedure described in Example 2. After 914 hours of lamp operation, the brightness loss was reduced from 29% (uncoated phosphor) to 15% (coated phosphors).

EXAMPLE 4

Phosphor slides of $YVO_4$:Eu were prepared as per Example 1. After the first lehring step, a PVD coating, approx. 200 Angstrom thick of aluminum isopropoxide, i.e. $Al(C_3H_7O)_3$, was produced on the phosphor slides by heating, at a low temperature (approx. 100° C.) in vacuum, a boat containing the aluminum isopropoxide in powder form.

Coated (and uncoated) phosphor slides underwent a second lehring treatment at about 500° C. to about 625° C., to convert the isopropoxide to the oxide.

After 980 hours of operation in the test lamps, the brightness loss of the uncoated phosphor was 28%, while that of the coated material was 16%.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for applying a continuous protective coating of an oxide overlying a layer of yttrium vanadate phosphor comprising the following steps:
   Step 1—applying a physical vapor deposition (PVD) coating of a metal of said oxide on said phosphor to form a metallic coating; and
   Step 2—lehring said metallic coating at about 500° C. to about 625° C. to form a continuous protective coating of said oxide overlying said layer of yttrium vanadate phosphor.

2. A process in accordance with claim 1 wherein said oxide comprises yttria.

3. A process in accordance with claim 1 wherein said oxide comprises alumina.

* * * * *